(12) United States Patent
Song et al.

(10) Patent No.: US 7,369,197 B2
(45) Date of Patent: May 6, 2008

(54) POLARIZER, PANEL FOR A LIQUID CRYSTAL DISPLAY, AND LIQUID CRYSTAL DISPLAY, INCLUDING A SCATTERING LAYER

(75) Inventors: Young-Goo Song, Suwon (KR); Kweon-Sam Hong, Seoul (KR); Han-Ju Lee, Seoul (KR); Yoon-Sung Um, Yongin (KR)

(73) Assignee: Samsung Electronics Co., Ltd. (KR)

( * ) Notice: Subject to any disclaimer, the term of this patent is extended or adjusted under 35 U.S.C. 154(b) by 137 days.

(21) Appl. No.: 10/523,983

(22) PCT Filed: Sep. 19, 2002

(86) PCT No.: PCT/KR02/01784

§ 371 (c)(1),
(2), (4) Date: Oct. 17, 2005

(87) PCT Pub. No.: WO2004/015488

PCT Pub. Date: Feb. 19, 2004

(65) Prior Publication Data

US 2006/0103780 A1 May 18, 2006

(30) Foreign Application Priority Data

Aug. 9, 2002 (KR) .................. 10-2002-0047139

(51) Int. Cl.
*G02F 1/1335* (2006.01)

(52) U.S. Cl. ...................................... 349/112
(58) Field of Classification Search .......... 349/64, 349/86, 112; 359/599
See application file for complete search history.

(56) References Cited

U.S. PATENT DOCUMENTS 5,469,278 A * 11/1995 Takahara et al. ............... 349/86
6,778,240 B2 * 8/2004 Nakamura et al. ........... 349/112
6,937,399 B2 * 8/2005 Takahashi et al. ........... 359/599

FOREIGN PATENT DOCUMENTS

| JP | 2004-324848 | 11/1992 |
|----|-------------|---------|
| JP | 05-273500 | 10/1993 |
| JP | 07-104287 | 4/1995 |
| JP | 08-202275 | 8/1996 |
| JP | 2001-194514 | 7/2001 |

OTHER PUBLICATIONS

International Search Report.

* cited by examiner

*Primary Examiner*—James A. Dudek
(74) *Attorney, Agent, or Firm*—Cantor Colburn LLP

(57) ABSTRACT

Red, green, blue color filters are arranged in sequence in pixel areas of an LCD according to the present invention. Filters, which are scattering particles of a scattering layer, are distributed in a net, and they are distributed in a diagonal direction such that the concentration of the fillers is lower in border areas located between the pixel areas than in the pixel areas.

15 Claims, 3 Drawing Sheets step A step B

POLARIZER, PANEL FOR A LIQUID CRYSTAL DISPLAY, AND LIQUID CRYSTAL DISPLAY, INCLUDING A SCATTERING LAYER

BACKGROUND OF THE INVENTION (a) Field of the Invention

The present invention relates to a polarizer, panel for a liquid crystal display, and liquid crystal display including a scattering layer.

(b) Description of Related Art

A liquid crystal display (LCD) includes a lower panel provided with thin film transistors (TFTs), etc., an upper panel provided with color filters and a blade matrix, etc., and a liquid crystal layer interposed therebetween. A plurality of pixel electrodes and a common electrode are formed on the respective panels or on a single panel and supplied with voltages. The LCD varies the voltages applied to the pixel electrodes and the common electrode to change the orientations of liquid crystal molecules. In this way, the LCD adjust the transmittance of light and displays images.

The liquid crystal material of an LCD has birefringence that the refractive indices in a direction of molecular long axes and in a direction of molecular short axes are different from each other. Due to the birefringence, the refractive index which the light experiences depends on the viewing direction of the LCD, and this differentiates the polarization of an incident light with linear polarization after passing through the liquid crystal. Therefore, the color characteristic and the amount of the light in a slanted direction are different from those in a front direction. In particular, a twisted nematic (TN) LCD suffers severe problems such as the contrast ratio depending on the viewing angle, color shift, gray inversion, etc., due to the variation of the retardation of the light.

A technique for solving these problems is developed, which compensates the phase difference in a specific direction using phase difference compensation films. This technique is to solve the viewing angle problem by compensating the phase deviation of the light generated by the liquid crystal in an opposite manner using the compensation films. Then, the viewing angle is ensured in twisted nematic type LCD using the phase difference compensation films, however, the gray inversion in lower viewing angle, etc. still remains. To solve this problem, it is proposed to attach a scattering layer to a polarization plate forming the gray inversion. However, broken characters are generated when haze value indicating the extent of light scattering is high, thereby deteriorating display characteristics.

SUMMARY OF THE INVENTION

A motivation of the present invention is to provide a polarizer, a panel for an LCD, and a LCD including a scattering layer capable of minimizing gray inversion and eliminating character breaking.

According to the present invention to achieve the motivation, fillers, which are scattering particles inducing light scattering that can be indicated as haze value, forming a scattering layer are distributed in a concentration having different values in pixel areas and in border areas located between the pixel areas.

The scattering layer may be formed on inner or outer surface of a liquid crystal cell including liquid crystal molecules arranged in twisted nematic mode between inner surfaces of two panels.

The LCD may further include upper and lower polarization plates attached to outer surfaces of the first and the second panels, respectively, and the upper polarization plate preferably includes an analyzer and first and second protective films attached on upper and lower sides of the analyzer, respectively.

The scattering layer may be disposed between the second panel and the upper polarization plate, between the first protective film and the analyzer, or on the first protective film opposite the analyzer.

The fillers may be distributed in a net, and they are distributed preferably in a diagonal direction in the pixel areas.

DETAILED DESCRIPTION OF PREFERRED EMBODIMENTS

Figure 1:
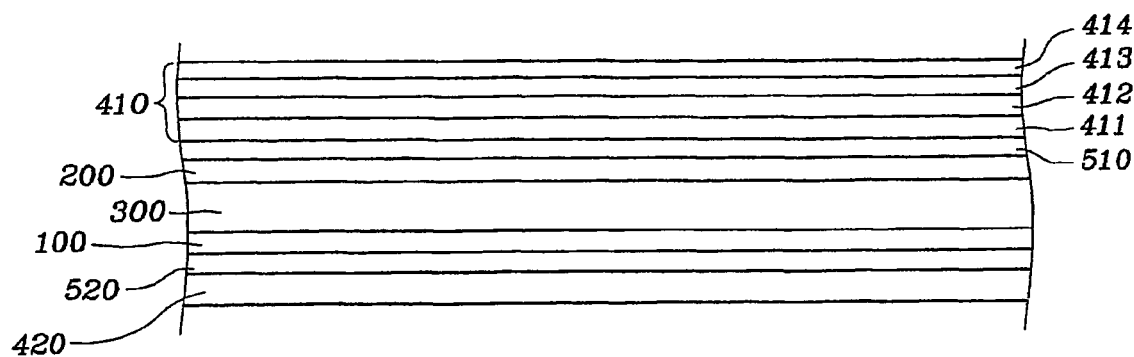
FIG. 1 is a schematic diagram showing an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to the elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Now, polarizers, panels for an LCD, and LCDs including scattering layers according to embodiments of the present invention are described in detail with reference to accompanying drawings.

FIG. 1 is a schematic diagram of an LCD according to an embodiment of the present invention.

As shown in FIG. 1, an LCD according to an embodiment of the present invention includes lower and upper panels 100 and 200 facing each other and including pixel areas arranged in a matrix, and a liquid crystal layer 300 interposed therebetween. The dielectric anisotropy $\Delta\varepsilon$ of the liquid crystal layer 300 is larger than zero. Liquid crystal molecules in the liquid crystal layer 300 have a twisted nematic configuration that the long axes of the liquid crystal molecules are parallel to the surfaces of the panels 100 and 200 and spirally twisted from one panel to the other in absence of electric field, and the liquid crystal molecules are oriented under application of electric field with a sufficient strength to the liquid crystal layer 300 such that long axes of the liquid crystal molecules are perpendicular to the surfaces of the panels 100 and 200 and parallel to the electric field.

The lower panel 100 includes a plurality of pixel electrodes for performing display operation formed on pixel areas arranged in a matrix and made of transparent conductive material and reflective conductive material, a plurality of gate lines and a plurality of data lines intersecting each other to define the pixel areas and transferring scanning signals and image signals, respectively, a plurality of TFTs electrically connected to the gate lines and the data lines and controlling the image signals from the data lines in response to the scanning signals from the gate lines, etc. The lower panel 100 is called TFT array panel A lower polarization plate 420 is attached to an outer surface of the lower panel 100.

The upper panel 200 includes a black matrix blocking the light leakage between the pixel areas and having openings corresponding to the pixel areas, a plurality of red, green, and blue color filters sequentially arranged in the pixel regions, and a common electrode supplied with a predetermined voltage for driving the liquid molecules in cooperation with the pixel electrodes and made of transparent conductive material such as ITO (indium tin oxide) or IZO (indium zinc oxide). An upper polarization plate 410 polarizing the light passing therethrough is attached to an outer surface of the upper panel 200 of the two panels 100 and 200.

Here, transmission axes of the polarization plates 410 and 420 attached to the outer surfaces of the two panels 100 and 200 may be parallel to or perpendicular to each other.

Compensation films 510 and 520 are attached between the lower and the upper polarization plates 410 and 420 and a liquid crystal cell 100, 200 and 300, respectively, and the compensation films 510 and 520 compensate the phase change of the light in the liquid crystal layer 300, thereby securing wide viewing angle.

The lower polarization plate 420 includes a polarizer or an analyzer containing PVA (poly vinyl alcohol) and iodine, and protective films (TAC: Tri acetate cellulose) attached to upper and lower surfaces of the polarizer, respectively. Moreover, the upper polarization plate 410 includes an analyzer 412 containing PVA and iodine and protective films 411 and 413 attached to upper and lower surfaces of the analyzer 412. In addition, a scattering layer 414 including scattering particles called fillers are formed on the upper protective film 413 of the upper polarization plate 410.

The scattering layer 414 may be formed on or under the lower protective film 411, between the upper panel 200 and the upper compensation film 510, or between the upper protective film and the analyzer 412.

Here, the scattering layer 414 scatters the light passing through the liquid crystal cell 100, 200, and 300 to all directions to equalize the light. Preferably, the haze value of the scattering layer 414 is equal to or more than 50. It is because that gray inversion in the lower direction can be effectively improved if the haze value of the scattering layer 414 is equal to or more than 50.

However, display characteristic may be deteriorated by generation of character breaking in case that the haze value of the scattering layer 414 is equal to or more than 50. According to the embodiment of the present invention to solve such problem, fillers, which are scattering particles of the scattering layer 414, are distributed in different concentration in pixel areas and border areas between adjacent pixel areas. In detail, the concentration in the border areas between the pixel areas is lower than that in pixel areas. Then, the light scattering in the border areas between pixel areas is minimized such that the gray inversion is minimized by adopting a haze value equal to or higher than fifty and the character breaking is eliminated. Now, this configuration is described in detail with reference to the figures.

Figure 2:
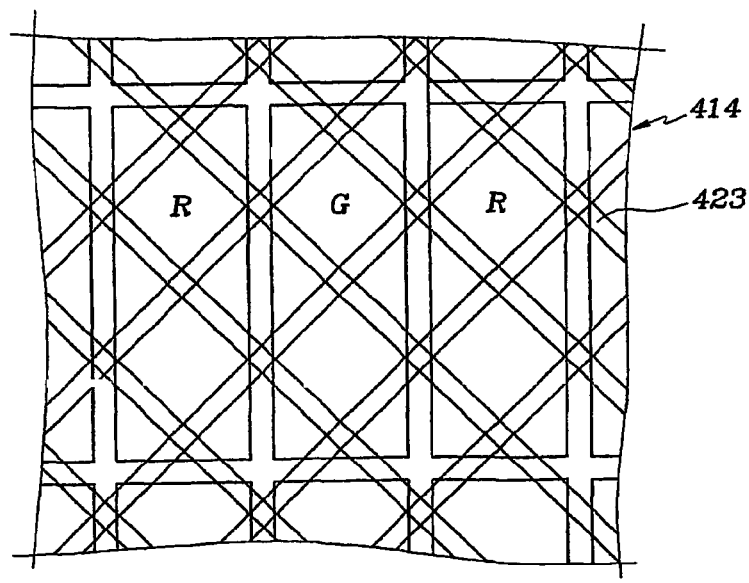
FIG. 2 is a layout diagram showing an arrangement of fillers, which are scattering particles of a scattering layer, and red, green, and blue pixels according to an embodiment of the present invention.

FIG. 2 is a layout diagram showing an arrangement of the fillers, which are scattering particles of the scattering layer, and red, green, and blue pixels according to an embodiment of the present invention.

As shown in FIG. 2, a plurality of red, green and blue color filters R, G, and B are arranged in sequence in pixel areas of a liquid crystal cell 100, 200, and 300 (shown in FIG. 1) according to an embodiment of the present invention. Here, scattering particles of the scattering layer 414, i.e., fillers 4123 are distributed in a net with a high concentration, and the intersections of the diagonals are preferably placed on border areas between the pixel areas such that the border areas between the pixel areas have a lower concentration of the fillers 423 than that in pixel areas. Although the fillers are distributed in a net with a high concentration, the fillers can have various arrangement.

In an LCD according to an embodiment of the present invention, a light linearly polarized by the lower polarization plate 420 attached on the lower panel 100 varies its polarization when passing through the liquid crystal layer 300. The light is linearly polarized again by the upper polarization plate 410 attached on the upper panel 200, and it is scattered to all directions by the scattering layer 414. Therefore, the amount and the color characteristics of the light do not depend on the viewing angle and thus negative phenomena such as color shift, gray inversion, etc. are minimized. Moreover, since the concentration of the fillers 423 in the border areas between the pixel areas is lower than the concentration of the fillers 423 distributed in the pixel areas, the light scattering in the border areas between the pixel areas can be minimized to eliminate the character breaking.

The scattering layer 414 is formed by attaching a scattering film to the outer surface of the polarization plate 410 facing the liquid crystal cell 10 and 20 as in the present invention, by applying light diffusion adhesive having light scattering function when the polarization plate 410 is attached to the upper panel 200, or by forming a light scattering layer made of resin containing minute dispersed particles on the color filters, and it may be formed with surface treatment of the upper protective film 413 of the upper polarization plate 410. Now, this will be described in detail with reference to the drawings.

Figure 3A:
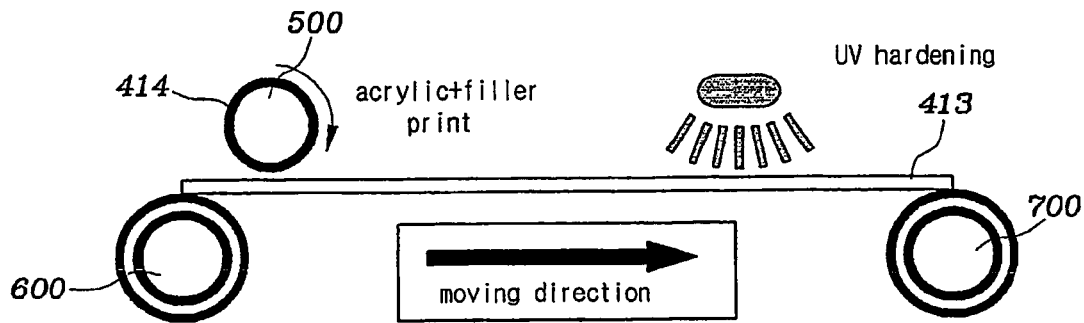
FIGS. 3A-3E show steps of a method of manufacturing a polarization plate including a scattering layer according to an embodiment of the present.
Figure 3B:
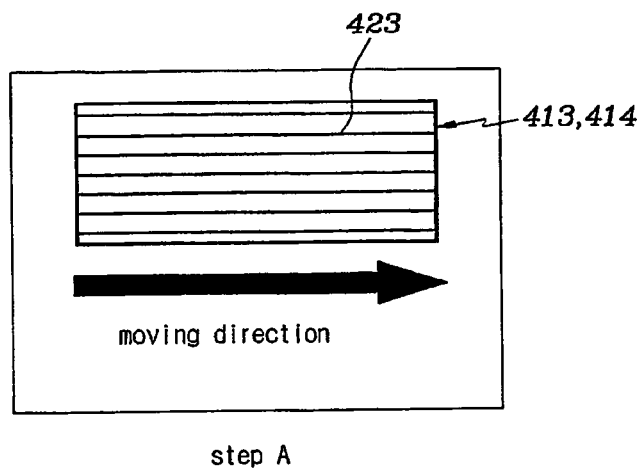
Figure 3C:
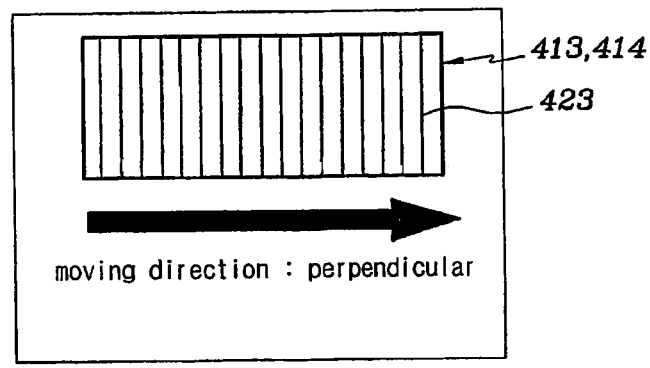
Figure 3D:
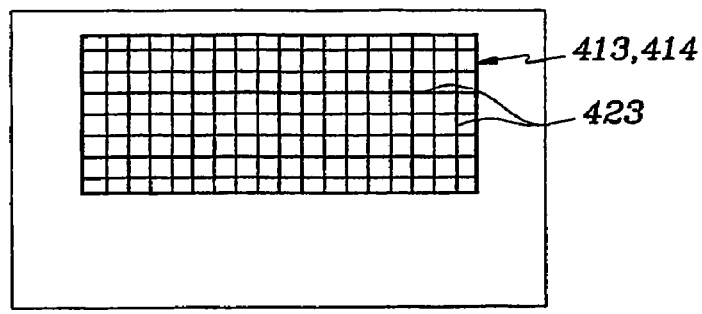
Figure 3E:
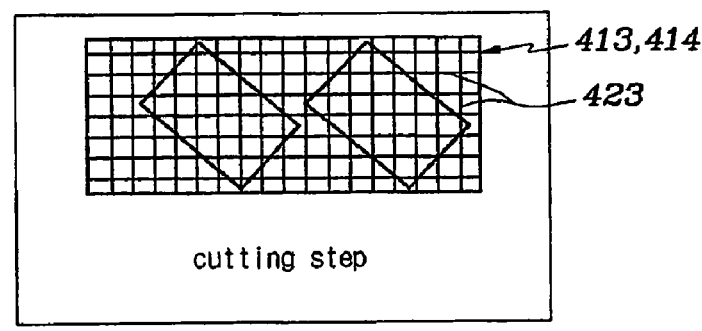
Figure 4:
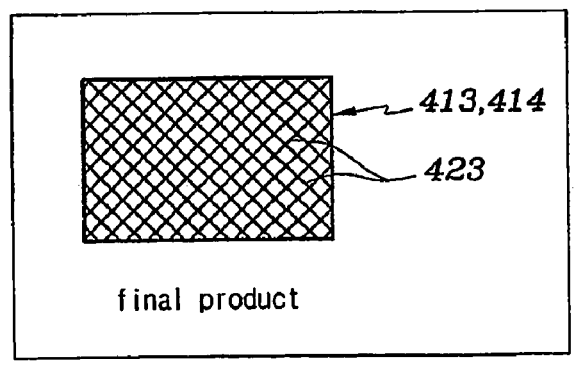
FIG. 4 shows a structure of a polarization plate manufactured by a manufacturing method according to an embodiment of the present invention.

FIGS. 3A-3E sequentially show steps of a manufacturing method of a polarization plate including a scattering layer according to an embodiment of the present, and FIG. 4 shows a structure of a polarization plate manufactured by the manufacturing method according to an embodiment of the present invention.

FIG. 3A shows the step of forming a scattering layer 414 on an upper protective film 413 (shown in FIGS. 1 and 2) among the steps of a manufacturing method of a polarization plate including a scattering layer according to an embodiment of the present invention. The upper protective film 413 moves in a direction indicated by an arrow using a first support 600 and a second support 700. A third roller 500 coated with scattering material including fillers and binder or acrylic rotates and contacts the upper protective film 413 to form a scattering layer 414 on the upper protective film 413, and the scattering layer 414 is hardened by UV (ultra violet) ray.

In order to obtain high concentration of the fillers 423 in a net in the scattering layer 414 as shown in FIG. 2, first, the concentration of the fillers 423 in a horizontal direction becomes high through a step A shown in FIG. 3B, and then the concentration of the fillers 423 in a vertical direction becomes high through a step B shown in FIG. 3C. Then, the upper protective film 413 including the scattering layer 414 containing the fillers 423 densely distributed in the horizontal and the vertical directions is obtained as shown in FIG. 3D.

The scattering layer 414 having fillers and binder or acrylic is coated to have protrusions in a net such that the concentration of the fillers 423, the scattering particles, is high along lines. Then, filler particles are gathered densely in the binder or acrylic protrusions, while they are distributed sparsely or scarcely in other parts. The fillers 423, the scattering particles have high refractive index, while the binder has low refractive index. Then, the protrusions function as concave lenses, and incident light is radially scattered by the fillers.

The upper protective film 413 is then cut to be attached onto the liquid crystal cell 100, 200 and 300, as shown in FIG. 3E, along lines making 45 degrees with edges of the upper protective film 413. Finally, the upper protective film 413 having a light scattering layer 414 containing the fillers 423 (shown in FIG. 2) distributed in diagonal directions in pixel areas as shown in FIG. 4 is manufactured.

As described above, the present invention makes the concentration of scattering particles, which are contained in a light scattering layer for inducing scattering to minimize gray inversion, be lower in border areas between pixel areas, thereby eliminating the gray inversion and preventing character breaking to improve display characteristic of a display device.

What is claimed is:

1. A panel for liquid crystal display comprising:
   a plurality of pixel areas arranged in a matrix; and
   a scattering layer defining an outer surface of the panel, the scattering layer containing fillers for inducing light scattering indicated as haze value,
   wherein the fillers are distributed in a concentration having different values in the pixel areas and in border areas located between the pixel areas.

2. The panel of claim 1, wherein the concentration of the fillers in the border areas is lower than that in the pixel areas.

3. A polarization plate for liquid crystal display, the polarization plate comprising:
   an upper protective film including fillers that are formed inside the upper protective film or are formed on at least one surface of the upper protective film for inducing light scattering indicated as haze value, the fillers distributed in a concentration different between in pixel areas and in border areas located between the pixel areas;
   an analyzer having a first surface, on which the upper protective film is attached, and a second surface facing the first surface; and
   a lower protective film attached to the second surface of the analyzer.

4. The polarizing plate of claim 3, wherein the concentration of the fillers is lower in the border areas than in the pixel areas.

5. A liquid crystal display comprising:
   a first and a second panels facing each other and having pixel areas arranged in a matrix;
   a liquid crystal layer interposed between the first panel and the second panel; and
   a scattering layer formed on an outer surface of the second panels and containing fillers for inducing light scattering as haze value, the fillers in a concentration different between in the pixel areas and in border areas located between the pixel areas.

6. The liquid crystal display of claim 5, wherein the concentration of the fillers is lower in the border areas than in the pixel areas.

7. The liquid crystal display of claim 6, further comprising upper and lower polarization plates attached to outer surfaces of the first and the second panels, respectively.

8. The liquid crystal display of claim 7, wherein the upper polarization plate comprises an analyzer and first and second protective films attached on upper and lower surfaces of the analyzer, respectively.

9. The liquid crystal display of claim 8, wherein the scattering layer is disposed between the second panel and the first protective film or on the first protective film opposite the analyzer.

10. The liquid crystal display of claim 5, wherein the fillers of the scattering layer are distributed in a net.

11. The liquid crystal display of claim 10, wherein the fillers are distributed in a diagonal direction in the pixel areas.

12. The panel of claim 11, wherein the parts of intersection of the fillers are located on a long side of the border area.

13. The panel of claim 1, wherein the fillers of the scattering layer are distributed in a net.

14. The panel of claim 13, wherein the fillers are distributed in a diagonal direction in the pixel areas.

15. The panel of claim 14, wherein the parts of intersection of the fillers are located on a long side of the border area.

* * * * *